(No Model.)

W. O. GUNCKEL.
CONVEYER.

No. 375,931. Patented Jan. 3, 1888.

Witnesses
H. Eaton Coleman,
F. A. Kerby.

Inventor
W. O. Gunckel.
By his Attorney
Herbert W. T. Jenner.

N. PETERS, Photo-Lithographer, Washington, D. C.

UNITED STATES PATENT OFFICE.

WINFIELD O. GUNCKEL, OF TERRE HAUTE, INDIANA.

CONVEYER.

SPECIFICATION forming part of Letters Patent No. 375,931, dated January 3, 1888.

Application filed August 31, 1887. Serial No. 248,390. (No model.)

*To all whom it may concern:*

Be it known that I, WINFIELD O. GUNCKEL, a citizen of the United States, residing at Terre Haute, in the county of Vigo and State of Indiana, have invented certain new and useful Improvements in Conveyers; and I do hereby declare the following to be a full, clear, and exact description of the invention, which will enable others skilled in the art to which it appertains to make and use the same.

This invention relates to conveyers; and it consists in the novel construction and combination of the parts hereinafter fully described and claimed.

Figure 1:
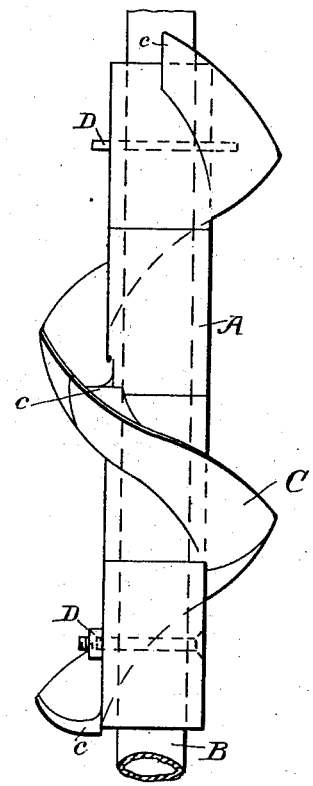
Figure 2:
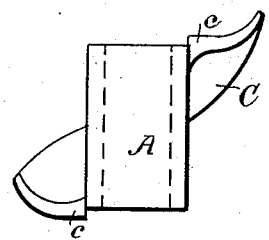
Figure 3:
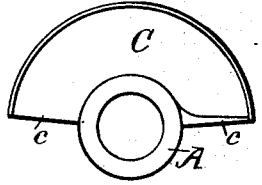

In the drawings, Figure 1 is a side view of the conveyer. Fig. 2 is a detail side view of a single conveyer-flight, and Fig. 3 is an end view of the same.

Each conveyer-flight consists of a central hub, A, which wholly surrounds the driving-shaft B, which is preferably hollow, but may also be made solid, and a blade, C, extending around about one-half the circumference of the hub. This blade is made concave upon its driving side, so that the material it operates upon is pressed toward the hub, instead of being forced against the inclosing-case of the conveyer and by its friction therewith increasing the load upon the conveyer.

The ends of the hub are faced off truly, the central hole is bored out, and each end $c$ of the blade projects for a short distance beyond the central hub, so that when the conveyer-flights are arranged in a series, the said projecting ends interlock with those of the next adjacent flights, and the whole series of flights is secured to the shaft by any suitable locking device, such as the pins or bolts D, which pass through the hubs of the two end flights.

The conveyer may be formed of any desired material; but cast malleable iron is preferred. The blades may be either right or left hand, and will operate efficiently upon any substance which is small enough to pass through the conveyer-casing.

What I claim is—

In a conveyer, the combination of a central shaft, a series of flights, each consisting of a central hub and a concave blade formed integral therewith and extending one-half around the circumference of the hub, with its ends projecting beyond the faced ends of the hub and interlocking with the ends of the next adjacent blades, and a pin for securing the two end flights of the series to the shaft, substantially as and for the purpose set forth.

In testimony whereof I affix my signature in presence of two witnesses.

WINFIELD O. GUNCKEL.

Witnesses:
   JNO. C. WARREN,
   CHARLES T. NOBLE.